US008583867B1

(12) United States Patent
Radhakrishnan et al.

(10) Patent No.: US 8,583,867 B1
(45) Date of Patent: Nov. 12, 2013

(54) NON-DISRUPTIVE DATA MIGRATION BETWEEN PROCESSING SYSTEMS THAT DO NOT SHARE STORAGE

(75) Inventors: Prashanth Radhakrishnan, Bangalore (IN); Vaibhav Singh, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 394 days.

(21) Appl. No.: 12/877,873

(22) Filed: Sep. 8, 2010

(51) Int. Cl.
*G06F 12/00* (2006.01)

(52) U.S. Cl.
USPC .......................................... 711/114; 711/162

(58) Field of Classification Search
USPC .................................................. 711/114, 162
See application file for complete search history.

(56) References Cited

U.S. PATENT DOCUMENTS

| 7,640,292 | B1 | 12/2009 | Smoot | |
|---|---|---|---|---|
| 2005/0228835 | A1 | 10/2005 | Roa | |
| 2006/0155748 | A1 | 7/2006 | Zhang et al. | |
| 2008/0104216 | A1* | 5/2008 | Ponnappan et al. | 709/223 |
| 2008/0222375 | A1* | 9/2008 | Kotsovinos et al. | 711/162 |
| 2008/0313364 | A1* | 12/2008 | Flynn et al. | 710/31 |
| 2010/0332373 | A1* | 12/2010 | Crabtree et al. | 705/37 |

OTHER PUBLICATIONS

Co-pending U.S. Appl. No. 12/877,890, filed Sep. 8, 2010.
Network Appliance™ Sync Mirror™ Software, Network Applicance, Inc. (2002) 2 pages.
Infrastructure Solution—Maintain Availability of Vital Business Data, NetApp (2009) 2 pages.
Non-Final Office Action Mailed Jun. 7, 2012 in Co-pending U.S. Appl. No. 12/877,890 of Radhakrishnan, P., et al., filed Sep. 8, 2010.
Final Office Action Mailed Dec. 3, 2012 in Co-pending U.S. Appl. No. 12/877,890 of Radhakrishnan, P., et al., filed Sep. 8, 2010.
Notice of Allowance Mailed Jan. 24, 2013 in Co-Pending U.S. Appl. No. 12/877,890 of Radhakrishnan, P., et al., filed Sep. 8, 2010.

* cited by examiner

*Primary Examiner* — Hashem Farrokh
(74) *Attorney, Agent, or Firm* — Perkins Coie LLP (57) ABSTRACT

A technique is disclosed for non-disruptive migration of data between storage on hosts that do not share storage with each other. Aggregate relocation is enabled to operate between the hosts in the absence of shared storage connectivity. The technique includes mirroring an aggregate from storage of a first host to storage of a second host by using a sub-RAID level proxy in each of the first and second hosts to proxy data communications between the hosts. The proxy is used in lieu of the mirroring application in the first host having direct access to the storage devices of the second host. The technique further includes relocating the aggregate from the first host to the second host.

7 Claims, 8 Drawing Sheets

NON-DISRUPTIVE DATA MIGRATION BETWEEN PROCESSING SYSTEMS THAT DO NOT SHARE STORAGE

FIELD OF THE INVENTION

At least one embodiment of the present invention pertains to data migration techniques, and more particularly, to the non-disruptive data migration between storage servers using direct-attached storage (DAS) or which otherwise do not share their storage with each other.

BACKGROUND

Network storage is a common approach to backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

There are two important trends today in the field of network storage. First, companies today more commonly package their products as virtual storage servers (VSSs) instead of as dedicated (special-purpose) physical storage servers (PSSs). This trend is driven primarily by cost considerations (i.e., it allows lower cost, generic server hardware to be used) and made feasible by the widespread use of system virtualization software in data centers. Second, data centers are increasingly starting to use "shared-nothing" storage environments; that is, in place of dedicated network storage servers, the copious DAS in commodity servers is pooled to provide "virtual" network storage systems. This trend is due to the higher capacities of today's hard drives, as well as a desire not to waste available storage space provided by these commodity servers.

Despite the growing prominence of DAS data centers, a data center operator may at some point find it desirable to transition its operations from a DAS-based VSS configuration (a "VSS-DAS" configuration) to a PSS-based configuration. For example, it may be desirable to upgrade from a relatively inexpensive VSS-DAS system to a more powerful PSS-based system. Or, a data center operator may find it desirable to move from a centralized PSS configuration to a potentially less-expensive VSS-DAS configuration. As another possibility, to facilitate a hardware upgrade of a PSS, it may be desirable to temporarily migrate data from the PSS to another storage server, where at least one of the two storage servers involved in the migration uses DAS (or where the two storage servers otherwise do not share storage with each other). As still other possibilities, it may be desirable to migrate from one VSS to another VSS, or from one PSS to another PSS, where at least one of the two storage servers involved in the migration uses DAS (or where the two storage servers otherwise do not share storage with each other).

This sort of data migration has the potential to be very disruptive to client applications that access data maintained by the storage servers. By "disruptive" what is meant is that it causes apparent downtime of the storage server from the viewpoint of a client application.

SUMMARY

There is a need in the art for a mechanism for non-disruptive data migration between different hosts that do not share their storage with each other, such as where at least one of the hosts' storage is DAS. The technique introduced here provides such a mechanism. It does so by allowing aggregate relocation, which conventionally would require direct shared storage connectivity between source and destination hosts, to operate between the hosts in the absence of such connectivity. The term "aggregate," as used herein, refers to a logical aggregation of physical storage, i.e., a logical container for a pool of storage, combining one or more physical mass storage devices or parts thereof into a single logical storage object, which contains or provides storage volume for one or more other logical data sets at a higher level of abstraction (e.g., volumes).

In this context, the source host may be, for example, a general-purpose server which includes DAS storage and a VSS while the destination host may be, for example, a dedicated PSS that has DAS storage. Alternatively, the source host may be, for example, a dedicated PSS with DAS storage while the destination host may be, for example, a general-purpose server which includes DAS storage and a VSS. Alternatively, both hosts may be VSSs or PSSs, at least one of which uses DAS, or which otherwise do not share their storage with each other.

In some embodiments the technique has two main aspects. First, it includes using RAID-level mirroring to mirror an aggregate from non-shared (e.g., DAS) storage of a first host to storage of a second host, by using a sub-RAID level proxy in each of the first and second host to proxy data communications between the hosts. The proxy is used in lieu of the mirroring application in the first host having direct access to the storage devices of the second host. Because the proxy is logically below the RAID layer, the mirroring operation does not require that the mirroring application have direct access to the storage devices of the second host. Second, the technique includes relocating the aggregate from the first host to the second host.

Other aspects of the technique will be apparent from the accompanying figures and detailed description. This summary is provided to introduce in a simplified form certain concepts that are further described in the Detailed Description below. This summary is not intended to identify essential features of the claimed subject matter or to limit the scope of the claimed subject matter.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
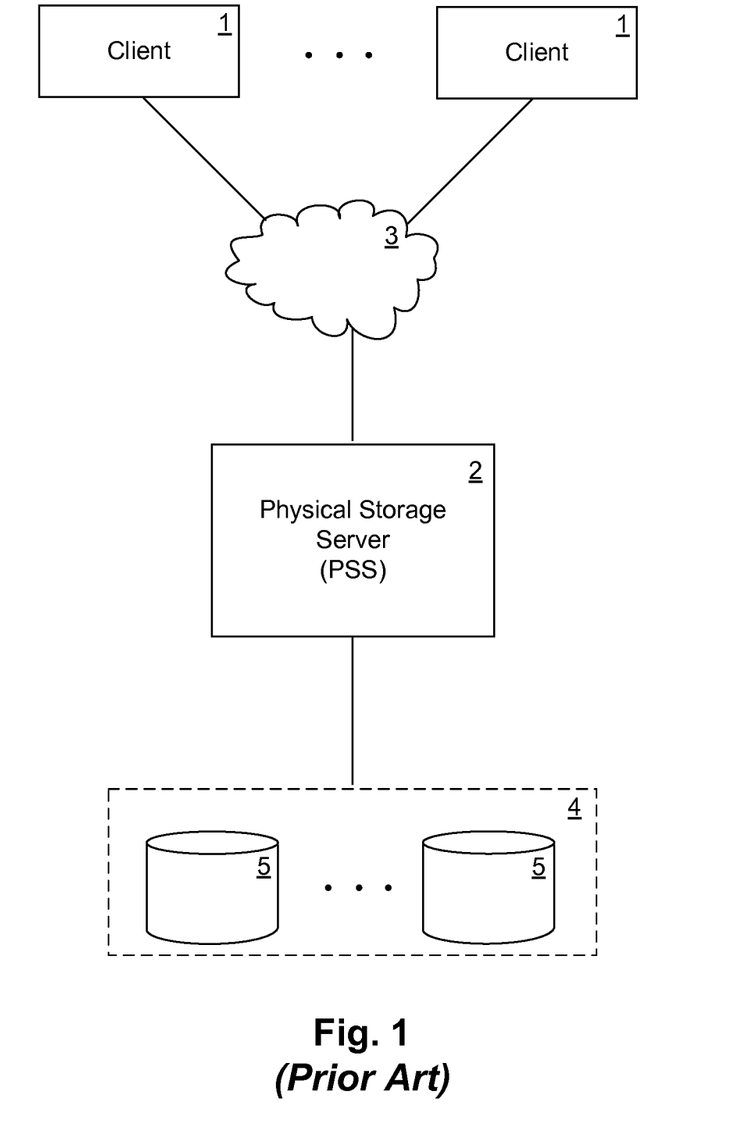
FIG. 1 illustrates a network storage environment based on the physical storage server.

FIG. 1 shows a conventional network storage environment based on a PSS. In FIG. 1, a PSS 2 is coupled to a storage subsystem 4 that includes non-volatile mass storage devices 5, and to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the storage subsystem 4 is managed by the PSS 2. The PSS 2 receives and responds to various read and write requests from the clients 1, directed to data stored in or to be stored in the storage subsystem 4. The mass storage devices 5 in the storage subsystem 4 can be, for example, conventional magnetic or optical disks or tape drives; alternatively, they can be non-volatile solid-state memory, such as flash memory or solid-state drives (SSDs). The mass storage devices 5 can be organized as a Redundant Array of Inexpensive Devices (RAID), in which case the storage server 2 accesses the storage subsystem 4 using one or more well-known RAID protocols. Further, in accordance with the techniques introduced here, the PSS 2 includes a storage operating system (not shown). The storage operating system is a functional module which controls most of the operations of the PSS 2, including servicing client initiated data access requests.

The PSS 2 may be a file-level server such as used in a NAS environment, a block-level storage server such as used in a SAN environment, or a storage server which is capable of providing both file-level and block-level data access. Further, although the PSS 2 is illustrated as a single unit in FIG. 1, it can have a distributed architecture. For example, the PSS 2 can include a physically separate network module (e.g., "N-blade") and data module (e.g., "D-blade") (not shown), which communicate with each other over an external interconnect.

Figure 2:
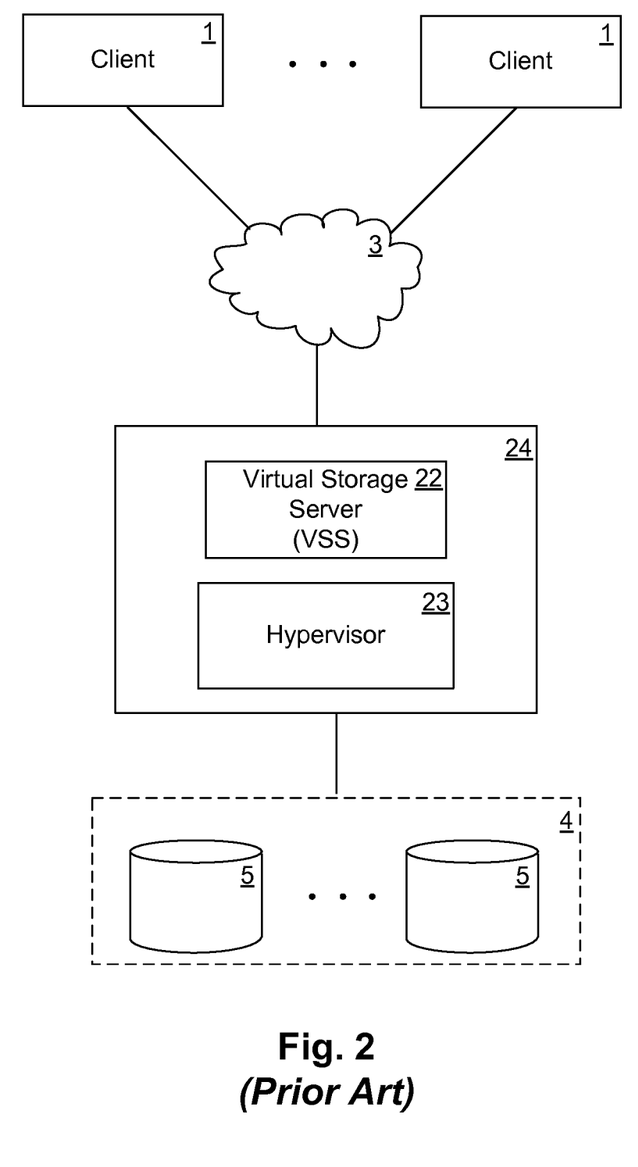
FIG. 2 illustrates a network storage environment based on a virtual storage server (VSS).

FIG. 2 illustrates a network storage environment similar to that of FIG. 1, except that a VSS 22 is employed rather than a dedicated PSS. As noted, this approach may be useful in reducing costs, because the VSS 22 runs on top of a hypervisor 23 within a commodity (inexpensive) physical server 24. An example of a suitable hypervisor may be, for example, ESX from VMWARE®. For purposes of this description, it may be assumed that the VSS operates in a manner essentially identical to that of the PSS in all significant respects.

Figure 3:
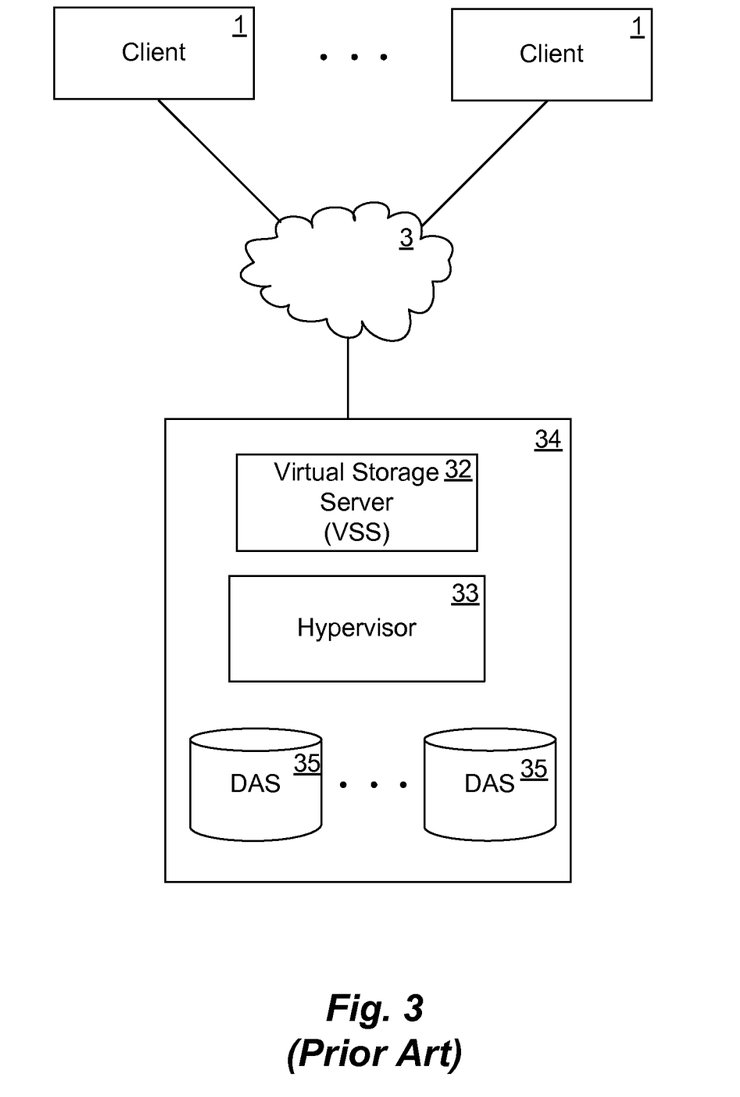
FIG. 3 illustrates a network storage environment based on a VSS and the use of DAS storage.

As noted above, it is becoming more common to employ pooled DAS ("shared nothing") storage in storage configurations of the type represented in FIG. 2. FIG. 3 illustrates an example of such an approach, which can be contrasted with the architecture of FIG. 1 in which DAS storage is not used. VSS 32 runs on top of a hypervisor 33 within a commodity (inexpensive) physical server 34, which includes DAS storage devices (e.g., disks) 35.

Figure 4:
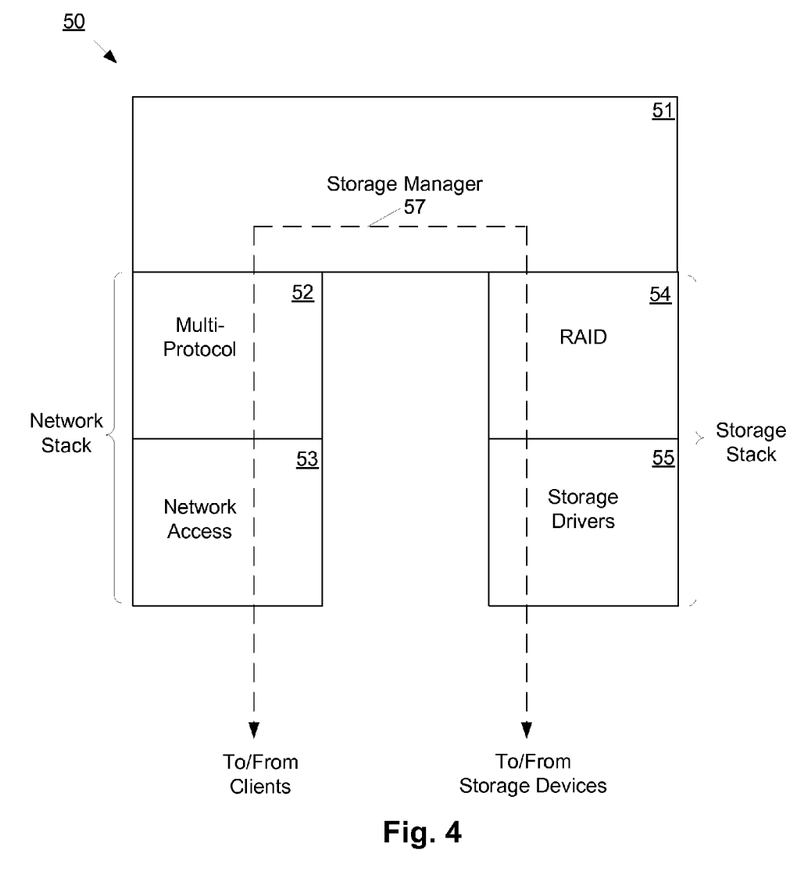
FIG. 4 illustrates an example of an architecture of a storage operating system in a storage server.

FIG. 4 illustrates an example of a storage operating system that can be employed to provide the major functionality in a VSS or a PSS. In the illustrated embodiment, the storage operating system 50 includes several modules, or "layers". These layers include a storage manager 51, which is the core functional element of the storage operating system 50. The storage manager 51 imposes a structure (e.g., a hierarchy) on the data stored by its host server, and services read and write requests from clients.

To allow the host storage server to communicate over a network (e.g., with clients), the storage operating system 50 also includes a multiprotocol layer 32 and a network access layer 53, logically "under" the storage manager 51. The multiprotocol 52 layer implements various higher-level network protocols, such as Network File System (NFS), Common Internet File System (CIFS), Hypertext Transfer Protocol (HTTP), Internet small computer system interface (iSCSI), and/or backup/mirroring protocols. The network, access layer 53 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

To allow the host storage server to communicate with its storage subsystem, the storage operating system 50 includes a RAID layer 54 and an associated storage driver layer 55 logically under the storage manager 51. The RAID layer 54 implements a higher-level RAID algorithm, such as RAID-0, RAID-1, RAID-4, RAID-5 or RAID-6. The storage driver layer 55 implements a lower-level storage device access protocol, such as Fibre Channel Protocol (FCP) or small computer system interface (SCSI). The RAID layer 54 and the storage drivers 55 are collectively called the "storage stack," whereas the multiprotocol layer 52 and the network access layer 53 are collectively called the "network stack." Also shown is the data path 57 between the clients and storage devices.

The storage operating system 50 can have a distributed architecture. For example, the multiprotocol layer 52 and network access layer 53 can be implemented in an N-module (e.g., N-blade) while the other components of the storage operating system 50 (e.g., storage manager 51, RAID layer 54 and storage drivers 55) are implemented in a separate D-module (e.g., D-blade). In such cases, the N-module and D-module communicate with each other (and, possibly, with other N- and D-modules) through some form of physical interconnect and together form a storage server "node". Such a storage server node can be connected with one or more other storage server nodes to form a highly scalable storage server cluster.

Before discussing the technique introduced here, consider that one alternative solution is to do data migration by establishing a volume-level mirroring relationships between the two hosts involved in the migration, i.e., the source host and the destination host. However, with known volume-level mirroring mechanisms, such an approach would not provide non-disruptive migration, and the granularity at which it operates is not as suitable (i.e., per-volume relationship vs. aggregate-level relationship).

Device Proxy

The non-disruptive migration technique introduced here allows the migration of data between storage hosts that do not share their storage with each other (e.g., where the storage of one or both hosts is DAS) to be achieved by employing an existing RAID-level mirroring product (as opposed to, for example, a volume-level mirroring product). One suitable example of such a product is the SYNCMIRROR® application from NETAPP®, Inc. of Sunnyvale, Calif. SYNCMIRROR is included in certain versions of NETAPP's Data ONTAP® storage operating system. Such a mirroring application normally "expects" direct access to both the source storage and the mirror destination storage. This can be achieved in effect with the above-mentioned device proxy mechanism, if the proxy mechanism is implemented logically below the RAID layer 54. This scenario is illustrated conceptually in FIG. 5.

Figure 5:
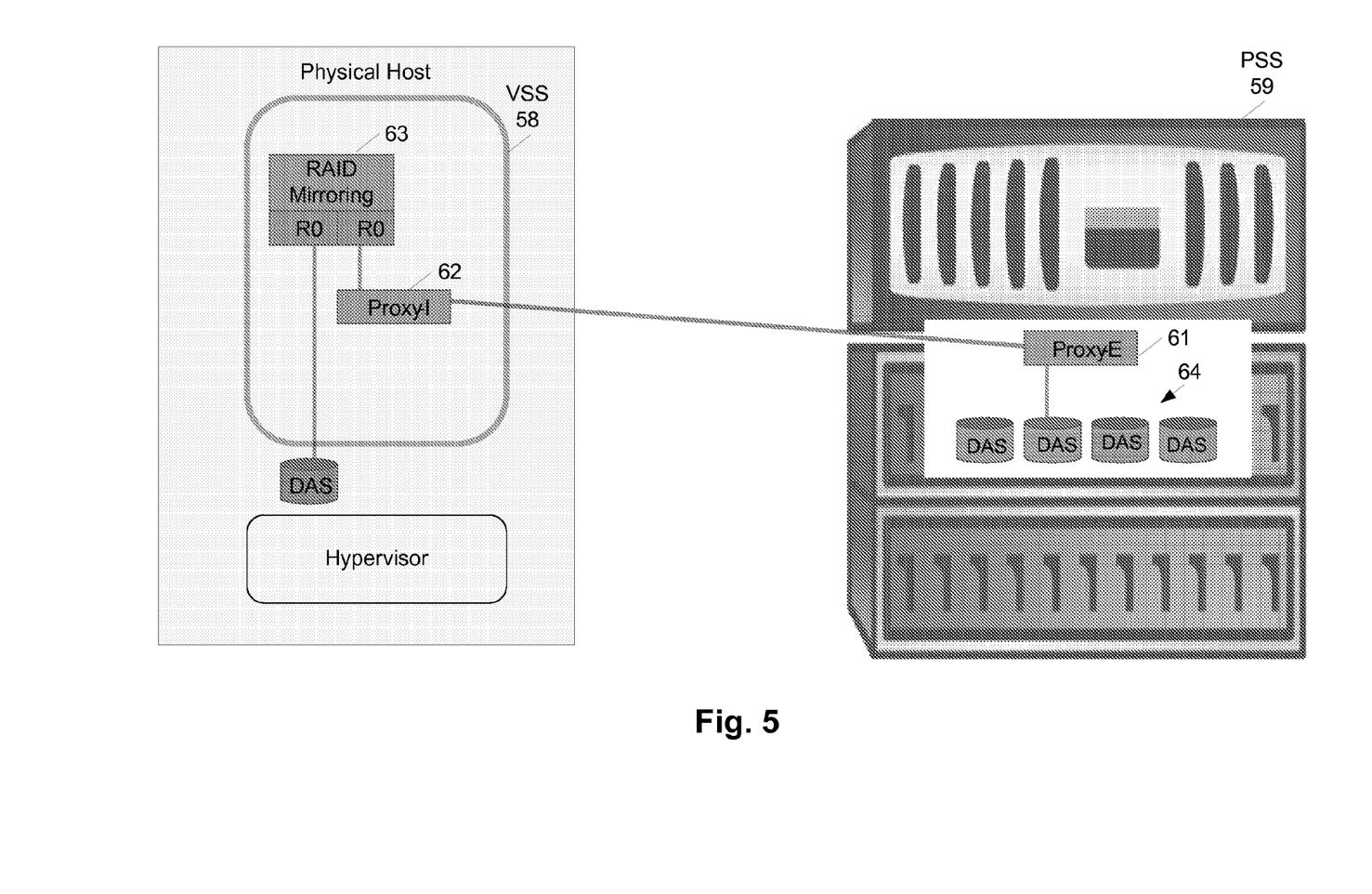
FIG. 5 shows a configuration for transparent migration of data from a VSS to a PSS.

FIG. 5 shows a configuration that may be used to facilitate migration of a DAS-based VSS 58 to a DAS-based PSS 59. In FIG. 5, the PSS 59 exports DAS storage device (or devices) 64 to the VSS 58. The VSS 58 has a mirroring aggregate over a local RAID-0 ("R0") plex and a "proxied" RAID-0 plex. When the mirror is synced, data migration has completed. Note that while FIG. 5 shows a RAID-0 plex, a mirroring aggregate can also be created over plexes of other types.

The term "plex," as used herein, refers to a subset of an aggregate in a data mirroring environment. Normally a mirroring environment includes a source plex and a mirror plex. If the mirror is broken, the source plex and the mirror plex become independent aggregates. An example of a plex is a RAID group.

As shown in FIG. 5, the device proxy in one embodiment contains two components in each storage server: an export component, "proxy-E" 61, and an import component, "proxy-I" 62. In general, a proxy-E 61 exports DAS storage devices of the local host to one or more remote hosts. A proxy-I 62, on the other hand, sits in the storage stack as a virtual host bus adapter (HBA) driver, imports the remote DAS storage device(s) exported by one or more remote hosts and presents them to the rest of the local subsystems, such as RAID. As can be seen, proxy-E 61 and proxy-I 62 both sit logically below the RAID mirroring layer 63, which in certain embodiments is implemented within the RAID layer 54 itself.

The technique introduced here could also apply where the roles of VSS and PSS are reversed, i.e., the PSS is the source host while the VSS is in the destination host. For example, it may be desirable to upgrade hardware of a PSS. To accomplish that in a way which is transparent to clients of the PSS, the aggregate of the PSS can be temporarily relocated to a VSS, by using the technique described above. In that case, to accomplish the initial migration from the PSS to the VSS (assuming they do not share storage), the PSS would also include a proxy-I (in addition to a proxy-E), and the VSS would also include a proxy-E (in addition to a proxy-I). In other embodiments both hosts (source and destination) could be VSSs, and in still other embodiments both hosts could be PSSs. Additionally, the technique introduced here is not necessarily limited to situations in which one or both hosts use DAS; rather, it is applicable to essentially any situation in which the hosts do not share their storage with each other for any reason.

Figure 6:
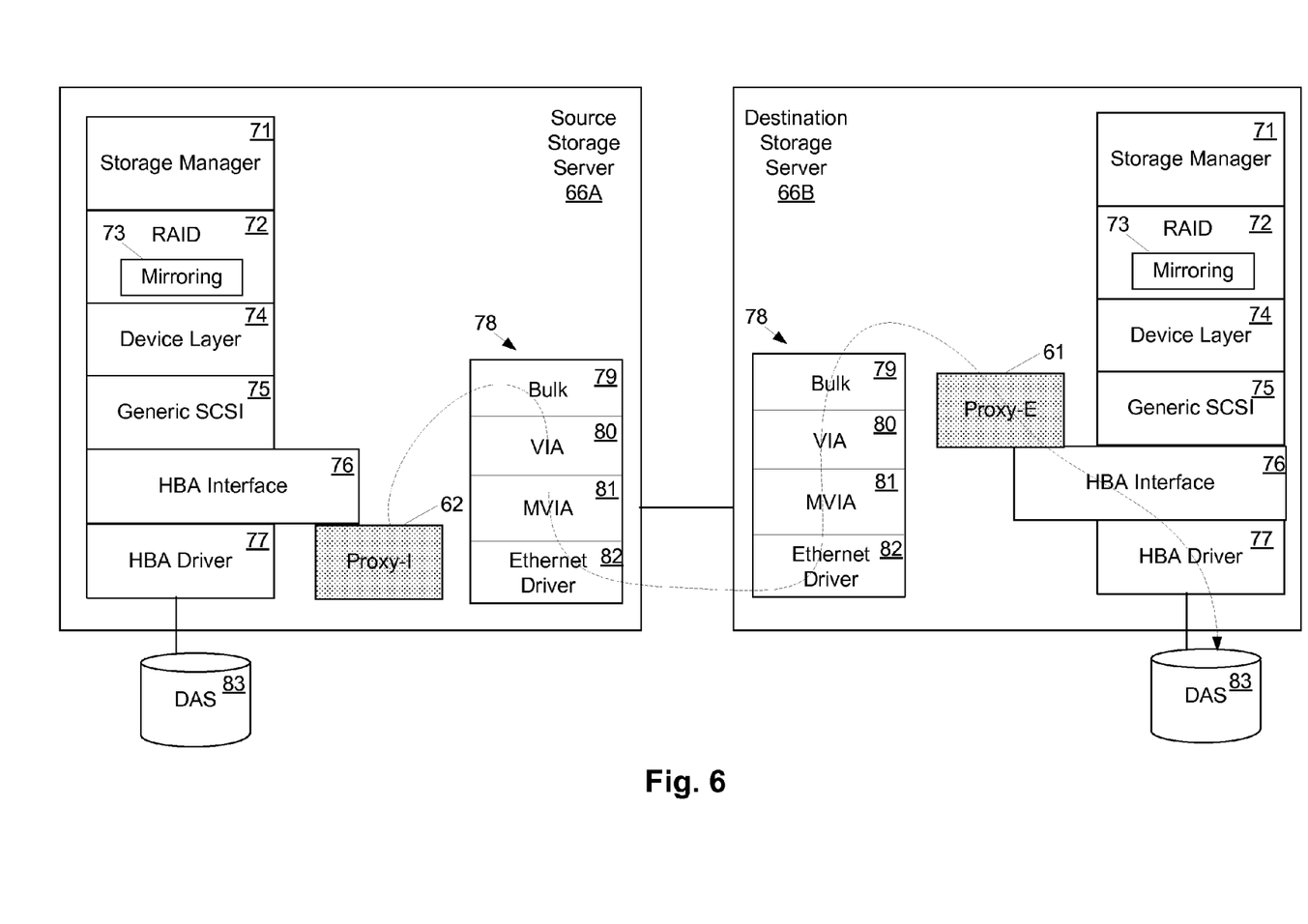
FIG. 6 shows an example of the placement of proxy components for migration of data from a source storage server to a destination storage server.

FIG. 6 shows an example of the placement of the two proxy components 61 and 62 in a storage operating system for use in non-disruptive data migration from one storage server (source storage server 66A) to another storage server (destination storage server 63B). In certain embodiments, one of the storage servers 66A or 66B may be a VSS while the other is a PSS. As shown, the storage stack employed in each storage server includes, under the storage manager 71 (going from high level to low level), a RAID layer 72 which includes a RAID mirroring layer 73, a storage driver layer, 74 a generic SCSI layer 75, a generic HBA interface layer 76 and an HBA driver layer 77. The HBA driver layer 77 provides the functional connection to the local DAS storage devices 83.

As shown, each storage server 66A, 66B further includes an interconnect stack 78 for communication with the other storage server. The interconnect stack 78 includes a bulk layer 79 at its top level, which provides the capability to transfer large amounts of data (i.e., several buffers at a time, where the buffer size can be, for example, 4 KB) over the interconnect. The bulk layer 79 operates on top of a conventional virtual interface architecture (VIA) layer 80, which operates on top of an emulated VIA (MVIA) layer 81, which operates on top of an Ethernet-based driver layer 82 (e.g., e1000).

Proxy-I operates logically just below the HBA interface layer 76, whereas proxy-E operates logically just above the HBA interface layer 76. It can be seen that both proxy-I and proxy-E operate logically below the RAID layer. Although not illustrated as such in FIG. 6 for simplicity, each storage server could include instances of both proxy-E 61 and proxy-I 62, although that is not necessary for a single migration operation going in one direction, as shown.

In one embodiment, a set of SCSI based on-wire commands is defined between proxy-I and proxy-E as follows:

Data plane commands, such as SCSI_SEND and SCSI_CALLBACK, are used for packaging SCSI requests and responses, respectively, over the network.

Control plane commands, such as DEVICE_LIST, DEVICE_REGISTER, and DEVICE_DEREGISTER, are used for exchanging information about the list of exportable disk devices, and about specific events such as addition or removal of disks.

Note that proxy-E in the illustrated embodiment is actually layered on top of the HBA interface layer 76. Thus, the solution is not dependent on the specific HBA driver 77 used.

Aggregate Relocation Between VSS and PSS

The technique introduced here uses a technique of aggregate relocation designed for situations where both the source and destination hosts have direct access to storage. The proxy mechanism described above makes this possible. Note that this process is non-disruptive to clients (e.g., for NFS, FCP or iSCSI protocols).

Figure 7:
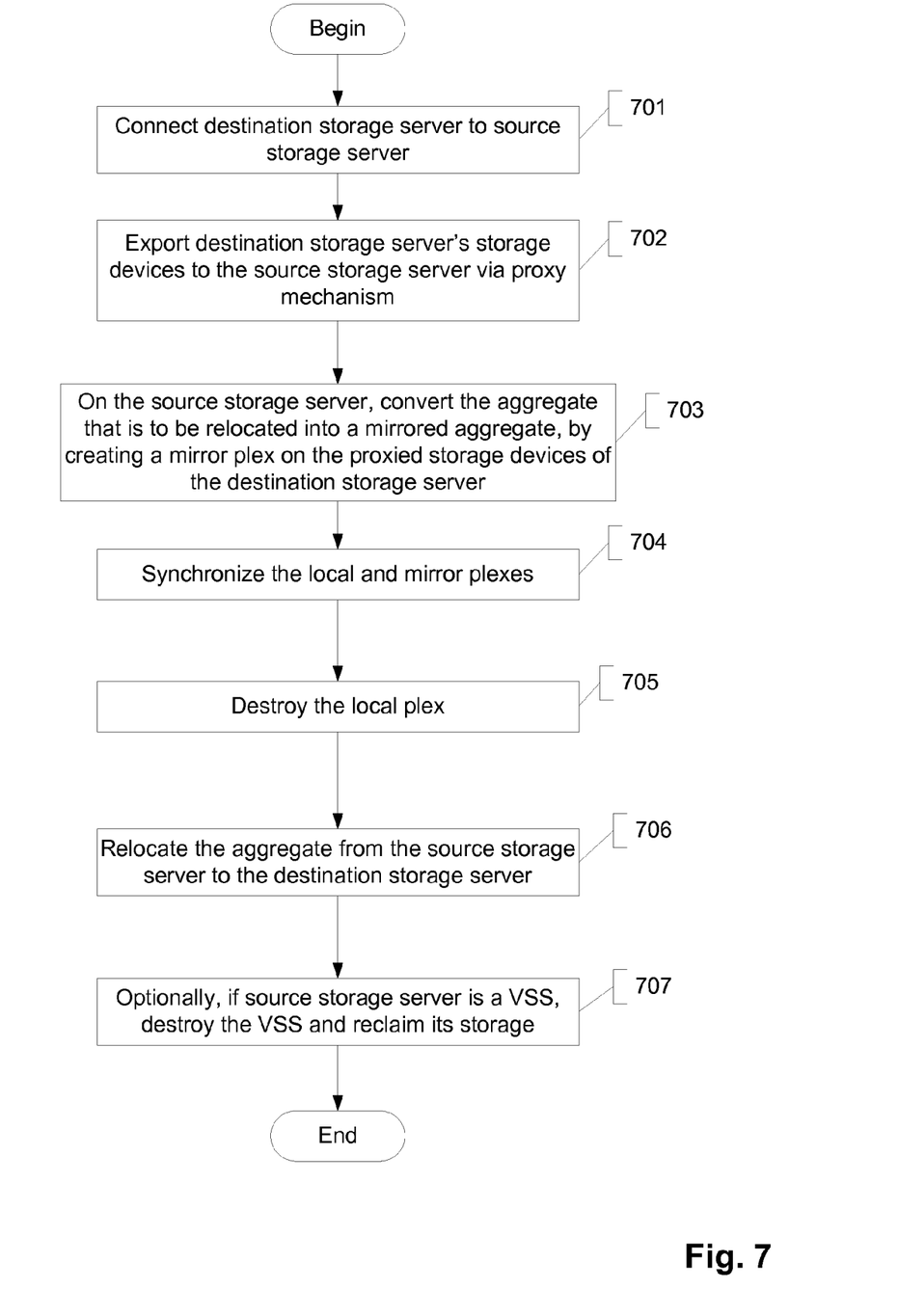
FIG. 7 is a flow diagram illustrating a process for non-disruptive migration of data from a source storage server to a destination storage server.

FIG. 7 illustrates an example of the process of non-disruptive data migration from a source storage server to a second storage server. One of the source storage server and the destination storage server may be a VSS while the other is a PSS, as explained above. Initially, at 701 a user (e.g., a storage administrator or technician) connects the destination storage server to the source storage server (or, if the source storage server is a VSS, to the VSS's physical host). The connection can be via any suitable transmission medium and protocol(s), such as Ethernet or InfiniBand, for example. At 702 the storage device(s) of the destination storage server are exported to the source storage server by using the above described proxy mechanism. This operation can be initiated by, for example, inputting a simple command at the destination storage server via a conventional user interface such as commonly provided by today's storage servers. At 703, on the source storage server, the aggregate that is to be relocated is converted into a mirrored aggregate. This can be done by using a known RAID-level mirroring mechanism, such as NETAPP's SYN-CMIRROR, and is a well-known function of such a mechanism. This function involves creating a mirror plex on the proxied storage devices of the destination storage server. Next, at 704 the local plex and the mirror plex are synchronized, which is also a well-known function of the conventional RAID-level mirroring mechanism. The local plex is then destroyed at 705, followed by relocation of the aggregate from the source storage server to the destination storage server at 706. Aggregate relocation basically involves three main steps:

1) Offlining the aggregate on the source host;
2) Changing the disk ownership to the destination host; and
3) Onlining the aggregate on the destination host.

These operations individually are well-known in the art.

Optionally, if the source storage server is a VSS, at 707 the VSS is destroyed and its storage is reclaimed for other uses.

Figure 8:
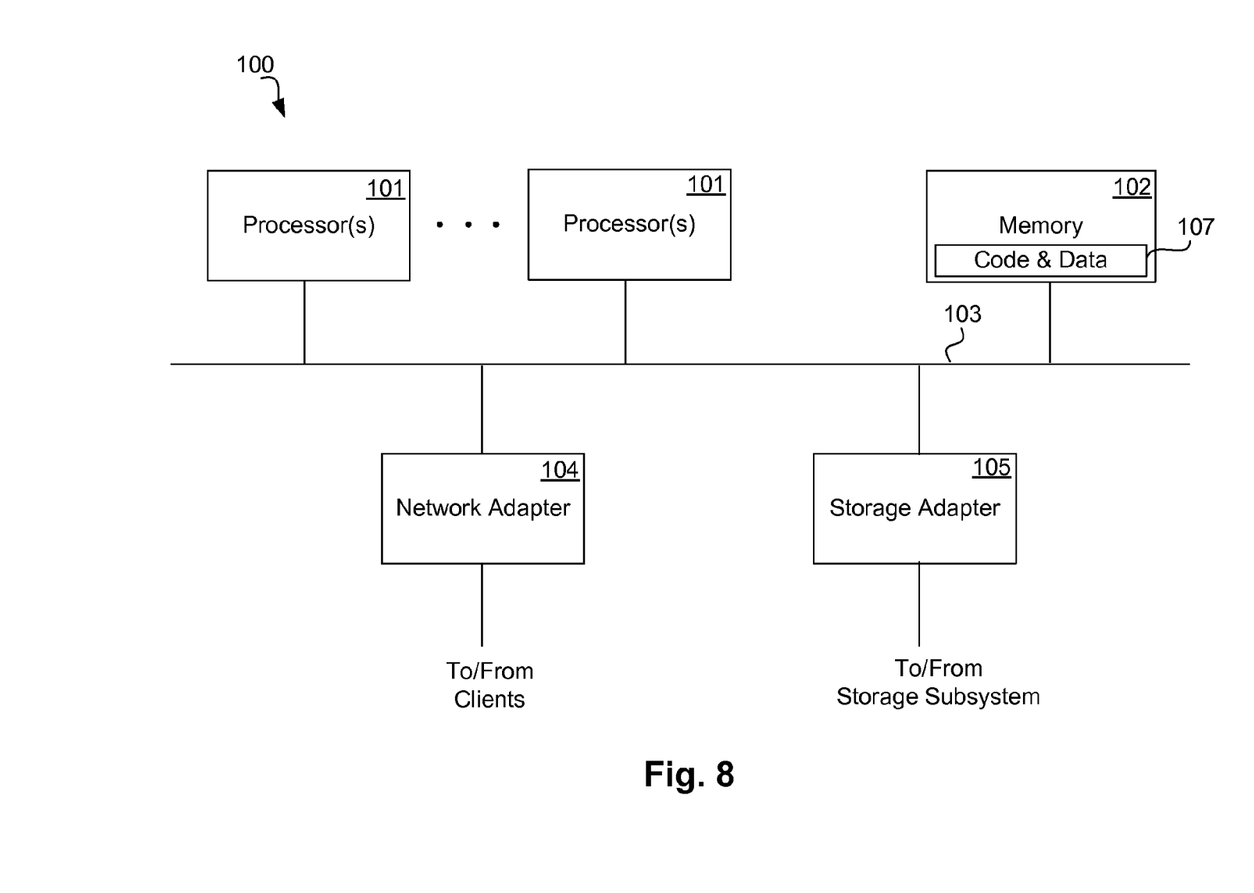
FIG. 8 is a high-level block diagram showing the architecture of a storage controller that can implement a storage server such as described herein.

FIG. 8 is a high-level block diagram showing the architecture of a storage controller that can implement a storage server such as described herein.

The storage controller 100 in the illustrated embodiment includes multiple processors 101 and memory 102, each coupled to an interconnect 103. The interconnect 103 is an abstraction that represents any one or more separate physical buses, point-to-point connections, or both connected by appropriate bridges, adapters, or controllers. The interconnect 103, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processors 101 may be or include the CPUs of the storage controller 100 and, thus, control the overall operation of the storage controller 100. In certain embodiments, the processor(s) 101 accomplish this by executing software or firmware stored in memory, such as memory 102. Each of the processors 101 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 102 is or includes the main memory (working memory) of the storage controller 100. The memory 102 represents any form of random access memory (RAM), read-only memory (ROM), flash memory (as discussed above), or the like, or a combination of such devices. In use, the memory 102 may contain, among other things, software and/or firmware code and data 107 for use in implementing the storage operating system and/or the deduplication engine, including the sorting technique introduced below.

Also connected to the processors 101 through the interconnect 103 are a network adapter 104 and a storage adapter 105. The network adapter 104 provides the storage controller 100 with the ability to communicate with remote devices, such as clients, over a network and may be, for example, an Ethernet adapter or Fibre Channel adapter. The storage adapter 105 allows the storage controller 100 to access its associated storage subsystem and may be, for example, a Fibre Channel adapter or a SCSI adapter.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software and/or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
operating a first storage server which includes a first storage set;
importing to the first storage server a second storage set of a second storage server, via a sub-RAID level proxy mechanism, wherein at least one of the first storage set and the second storage set is DAS;
converting an aggregate on the first storage set into a mirrored aggregate by creating a local plex on the first storage set;
sending data from the first storage server to the second storage server to cause a mirror plex on the second storage server to become synchronized with the local plex; and
causing the aggregate to be relocated from the first storage server to the second storage server.

2. A method as recited in claim 1, wherein said method is non-disruptive to clients of the first storage server.

3. A method as recited in claim 2, wherein the first storage server is a virtual storage server (VSS) and the second storage server is a dedicated physical storage server (PSS).

4. A method as recited in claim 2, wherein the first storage server is a dedicated physical storage server (PSS) and the second storage server is a virtual storage server (VSS).

5. A method as recited in claim 1, wherein the proxy mechanism comprises a sub-RAID level import proxy in the first storage server and a sub-RAID level export proxy in the second storage server.

6. A method as recited in claim 5, wherein the first storage server is a virtual storage server (VSS) and the second storage server is a dedicated physical storage server (PSS).

7. A method as recited in claim 5, wherein the first storage server is a dedicated physical storage server (PSS) and the second storage server is a virtual storage server (VSS).

* * * * *

UNITED STATES PATENT AND TRADEMARK OFFICE
CERTIFICATE OF CORRECTION

Page 1 of 1

PATENT NO. : 8,583,867 B1
APPLICATION NO. : 12/877873
DATED : November 12, 2013
INVENTOR(S) : Prashanth Radhakrishnan et al.

It is certified that error appears in the above-identified patent and that said Letters Patent is hereby corrected as shown below:

Title Page, Item (56), in column 2, under "Other Publications", line 3,
delete "Applicance, Inc." and insert -- Appliance, Inc. --, therefor.

In the Specification

In column 2, line 59, delete "server;" and insert -- server. --, therefor.

Signed and Sealed this
Twenty-seventh Day of May, 2014

Michelle K. Lee
*Deputy Director of the United States Patent and Trademark Office*